Nov. 22, 1955   M. DUMUR   2,724,343
SINGLE ROPE CABLEWAY
Filed Jan. 28, 1953

INVENTOR:
MARC DUMUR
BY:

United States Patent Office 2,724,343
Patented Nov. 22, 1955

2,724,343

SINGLE ROPE CABLEWAY

Marc Dumur, Cully, Switzerland, assignor to Giovanola Freres S. A., Clos Douroux, Monthey, Switzerland, a firm of Switzerland Application January 28, 1953, Serial No. 333,664

Claims priority, application Switzerland January 31, 1952

3 Claims. (Cl. 104—205)

My copending specification Ser. No. 251,950 filed October 18, 1951, discloses a single rope cableway including a carriage provided on one hand with jaws adapted to clamp automatically the carrying and driving cable and on the other hand with a suspension carrying the car or the like fittings for the passengers of the cable railway, one at least of said jaws being controlled by the horizontal sliding movement of a slider guided in a slideway formed in the carriage, while the suspension is vertically movable inside a guide provided on the carriage, the suspension being connected with the slider by means of an oblique slideway provided on one of the two members considered and cooperating with stops or trunnions provided on the other member; furthermore the suspension includes a bearing member adapted to provide for its upward movement through transient contacting with a stationary releasing sloping member; this prior arrangement considered as a whole was designed in a manner such that the raising of the suspension inside its guide produced a release of the jaws while the lowering of the suspension under the action of its load produced a clamping of said jaws.

My present invention has for its object an improvement in the cableway thus provided, according to which an oblique slideway-forming slot provided in a suspension bar assumes different slopes along its length and cooperates with transverse trunnions provided on the slider so that the vertical movements of the suspension bar and of the slot inside the guide considered throughout the length of the slot, may produce elementary horizontal displacements of the slider and thereby of the jaw controlled thereby, the amplitudes of which vary throughout the total extent of the movement of said slider.

Accompanying drawings illustrate, by way of example, a preferred embodiment of the invention.

Figure 1:
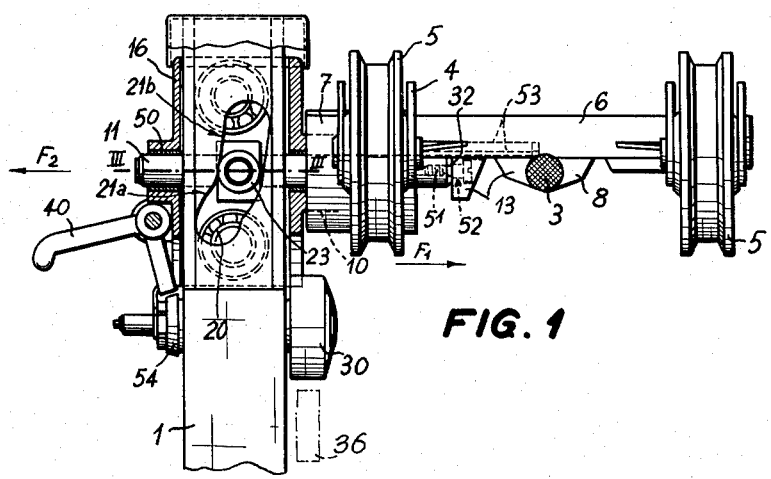
Figs. 1 and 2 are elevational views of the carriage in a plane perpendicular to the cable, said elevational views illustrating two main positions to be assumed by the slider and by the movable jaw on the carriage.

As illustrated, the suspension bar 1 of the cableway, the passenger car of which has not been illustrated, is connected with a carriage 4, 6 the wheels 5 of which are adapted to run over stationary rails 37 provided at the station. A stationary jaw 8 is rigid with the transverse plate or body 6 of the carriage. The carriage is provided with a transverse bearing 7 inside which may rock a horizontal cylindrical arm 10 forming part of a T-shaped guide extending sideways as shown at 10—16.

A slider including an elongated body 11 may slide inside an anti-friction bearing 50 carried inside the arm 10 which forms thus a slideway for the slider. In its right hand section, as shown in Fig. 1, said slider 11 carries a screw 51; said screw is provided on a portion of its shank near the head with a smooth bearing fitted in a perforation 52 formed inside a movable jaw 13, said jaw being guided longitudinally inside a groove 53 of the body 6 of the carriage. The head of the screw 51 serves for the axial driving of the movable jaw 13, which is adapted to rock round the axis of the slider 11 in accordance with the variations in slope of the cable 3.

The outer parallelopipedic section 16 of the T-shaped guide 10—16 that is provided with vertical walls, carries inside it with a slight clearance two parallel arms 17 forming upper extensions for the suspension bar 1.

Figure 3:
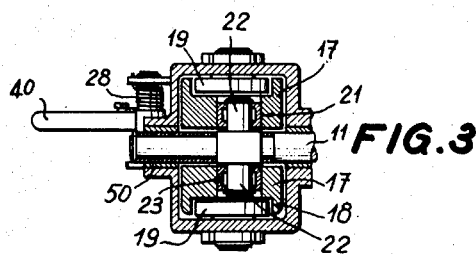
Fig. 3 is a sectional horizontal view of the guideway through line III—III of Fig. 1.

Each arm 17 is provided on its outer surface with a trough-shaped recess having vertical walls and the sides 18 of which (Fig. 3) form bearings for two rollers 19 carried by ball or needle bearings 20 housed in opposite surfaces of the guide section 16. Furthermore, each arm 17 is provided wiht an elongated cam slot 21 that is oblique with reference to the horizontal arm 10 of the guide.

The slider 11 carries transverse cylindrical trunnions useful as cam followers 22 engaging with the interposition of needle bearings 23 the corresponding oblique cam slots 21.

Each cam slot 21 includes a lower and an upper part differently sloped, the average direction of the lower part $21a$ defining with the vertical an angle $\alpha$ wider than the angle $\beta$ defined by the average direction of the upper part $21b$ and the vertical.

The guide section 16 carries a transverse lug 26 forming a pivot for the bell crank 40—27, the lower arm 27 of which may engage under the action of the spring 28, a ring 54 adjacent to and rigid with the suspension 1. The arm 40 of said bell crank is shifted laterally so as not to touch the left hand side of the slider 11.

The suspension bar 1 carries underneath the guide section 16 a bearing roller 30 fitted over a roller bearing.

During normal operation and under the action of gravity, the suspension bar 1 including its upper arms 17 is in a somewhat lower position with reference to the carriage as shown in Fig. 1. The upper section $21b$ of the oblique slot the slope of which is very steep exerts consequently on the cam followers 22 of the slider 11 an oblique thrust having a large horizontal component in the direction of the arrow $F_1$. Through its shoulder 32, the slider 11 transmits its thrust in said direction $F_1$ to the jaw 13 which clamps the cable 3 in cooperating relationship with the stationary jaw 8.

If, outside the station, the suspension bar 1 is submitted to a rocking movement while the load is light so that it has a tendency to rise inside the guide 16, this is prevented by the lever arm 27 engaging the ring 54.

Figure 2:
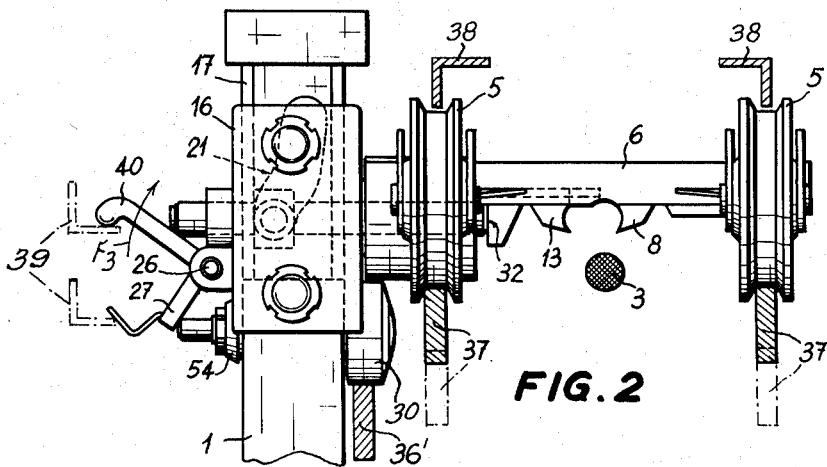

Each station of the ropeway is provided with a vertically reciprocable disconnecting track 36 sloped up with respect to the cable 3 and adapted to take a lower position, shown by dot and dash lines in Fig. 1, or an upper position 36' shown in full line in Fig. 2. Besides, each station is provided with a stationary releasing bar 39 conveniently shaped along its length to release the locking bell-crank 27—40 as hereinafter described.

As soon as a carriage is coming to a station, the wheels 5 run on the guiding rails 37, so that the cable 3 is freed from the weight of the load. Then the upper arm 40 of the bell-crank 27—40 engages the releasing bar 39 and is caused to rock in the direction of the arrow $F_3$ (Fig. 2). Consequently, the lower arm 27 disengages the ring 54, thus allowing the extensions 17 of the suspension bar 1 to slide vertically upwards inside the guide section 16 under the action of the disconnecting track 36. Upon moving from its lower position 36 (Fig. 1) to its upper position 36', the said disconnecting track 36 gradually lifts the roller 30 and the suspension bar 1 up with the load, whereby the extensions 17 of bar 1 slide upwards in the guide section 16 with respect to the carriage 4, 6 which is prevented from being raised by guard rails 38 (Fig. 2). Consequently, by reason of the rising movement of the suspension bar, the portion 21b of the cam slots 21 exerts on the cam followers 22 a thrust in the direction of the arrow $F_2$, which results in pulling the movable jaw 13 away from the cable 3, since the head of screw 51 is pressed against the edge of the perforation 52 in the jaw 13. The guiding rails 37 now raise the carriage 4—6 above the cable 3 as shown in Fig. 2. The lower portions 21a of the cam slots 21 act then on the cam followers 22 while the suspension bar 1—17 rises. These cam portions 21a defining with the vertical an angle $\beta$ very smaller than the angle $\alpha$ between the upper portions 21b and the vertical, the movable jaw 13 is travelling at a higher speed away from the stationary jaw 8 in this second stage of operation.

The different members then assume the position illustrated in Fig. 2.

For restarting the carirage system and the load to leave the station, the carriage and the suspension means are propelled, by means not shown, along a portion of the guiding rails 37 and the guard rails 38 adapted to return the jaws 8 and 13 into a level registering with the location of the cable 2.

Then the disconnecting track 36 is caused to sink with reference to the guideway 16, thus allowing of a lowering of the suspension bar 1 and the load under the action of gravity. This lowering motion is actually ending at a point beyond the disconnecting track 36 on leaving the station. The sinking of the cam slots 21 in the guideway, by acting on the cam followers 22 in the direction of the arrow $F_1$, returns the slider 11 and the movable jaw 13 into their operative cable clamping positions, first at a relatively high speed under the control of the lower portion 21a of the cams, and then at a relatively slow rate but with a powerful thrust on the movable jaw 13 for the actual clamping of the cable 3 between the jaws 13 and 8, due to the action of the upper part 21b of the cam slots 21 on their respective cam followers 22.

At substantially the same time, the releasing bar 39 is lowered, by means not shown. Consequently, the bell-crank 27—40 rocks in the anticlockwise direction and the locking arm 27 of the bell-crank re-engages the ring 54, as shown in Fig. 1.

By reason of the pivotal connection of the guide member 16—10 to the carriage 4, 6 ensured by the cylindrical arm 10 mounted for rocking movement in the horizontal bearing 7, the clamping stress of the movable jaw on the cable 3 does not depend on the variations in slope of said cable between the stations.

The length of the upper cam portions 21b is sufficient for ensuring an efficient clamping of the cable, even if the diameter of the latter should be altered.

What I claim is:

1. In a ropeway operated by a single cable between a plurality of stations, the provision of a carriage adapted to run on guiding rails at said stations, two jaws one of which is rigid with the carriage and the other is slidably carried thereon to move in a direction transverse and horizontally with reference to the cable, said jaws being adapted to clamp the cable between them, suspension means indirectly mounted on said carriage and adapted to carry the load, said carriage being provided with a bearing, the axis of which is normally parallel to said direction of said movable jaw, a guiding member comprising a horizontal hollow cylindrical arm pivotally fitted in said bearing, and a vertical hollow portion, said hollow cylindrical arm being provided with an inner slideway parallel to the direction of said movable jaw, a slider adapted to be reciprocated in said slideway, a swivelling link connecting said slider with said movable jaw, said suspension means including two vertical extensions rigid with the upper end thereof and engaging said vertical portion of said guiding member, said extensions being located respectively to the front and to the rear of the slider and provided with cam slots generally oblique with reference to the vertical and registering with each other, said cam slots including each one a lower and an upper part differently sloped, the average direction of the lower part defining with the vertical an angle larger than the angle defined by the average direction of the upper part and the vertical, said slider carrying two opposite rollers useful as cam followers engaging said respective cam slots in the extensions, a vertically reciprocable disconnecting track adapted to take an upper and a lower position at each station, said track being sloped up with respect to said cable, so that in its upper position, said track is adapted to raise the suspension means in the guideway as it passes into a station, the raising of the suspension means acting on the slider through said cams in the extensions and said cam followers to urge the slider and movable jaw away from the fixed jaw, the lowering of the suspension means and load under the action of gravity at a point beyond the disconnecting track at each station returning the slider and movable jaw into their operative cable clamping positions first at a relatively high speed and with a small force, under the action of the lower part of said cam slots on their respective cam followers, and then at a relatively slow rate but with an energic thrust, for the actual clamping of the cable between the jaws, under the action of the upper part of said cam slots on their respective cam followers.

2. In a ropeway operated by a single cable between a plurality of stations, the provision of a carriage adapted to run on guiding rails at said stations, two jaws one of which is rigid with the carriage and the other is slidably carried thereon to move in a direction transverse and horizontally with reference to the cable, said jaws being adapted to clamp the cable between them, suspension means indirectly mounted on said carriage and adapted to carry the load, said carriage being provided with a bearing, the axis of which is normally parallel to said direction of said movable jaw, a guiding member comprising a horizontal, hollow cylindrical arm pivotally fitted in said bearing and a vertical hollow portion, said hollow cylindrical arm being provided with an inner slideway parallel to the direction of said movable jaw, a slider adapted to be reciprocated in said slideway, a swivelling link connecting said slider with said movable jaw, the said suspension means including two vertical extensions rigid with the upper end thereof and engaging said vertical portion of said guiding member, said extensions being located respectively to the front and to the rear of the slider and provided with cam slots generally oblique with reference to the vertical and registering with each other, said cam slots including each one a lower and an upper part differently sloped, the average direction of the lower part defining with the vertical an angle larger than the angle defined by the average direction of the upper part and the vertical, said slider carrying two opposite rollers useful as cam followers engaging said respective cam slots in the extensions, said vertical extensions being provided on their outer surface with a gutter-shaped recess having vertical side walls forming races, said vertical hollow portion of said guiding member being provided on either side thereof with vertical rollers engaging either race in the corresponding recess, a vertically reciprocable disconnecting track adapted to take an upper and a lower position at each station, said track being sloped up with respect to said cable, so that in its upper position, said track is adapted to raise the suspension means in the guideway as it passes into a station, the raising of the suspension means acting on the slider through said cams in the extensions and said cam followers to urge the slider and movable jaw away from the fixed jaw, the lowering of the suspension means and load under the action of gravity at a point beyond the disconnecting track at each station returning the slider and movable jaw into their operative cable clamping positions first at a relatively high speed and with a small force, under the action of the lower part of said cam slots on their respective cam followers, and then at a relatively slow rate but with an energic thrust, for the actual clamping of the cable between the jaws, under the action of the upper part of said cam slots on their respective cam followers.

3. In ropeway operated by a single cable between a plurality of stations, the provision of a carriage adapted to run on guiding rails at said stations, two jaws one of which is rigid with the carriage and the other is slidably carried thereon to move in a direction transverse and horizontally with reference to the cable, said jaws being adapted to clamp the cable between them, suspension means indirectly mounted on said carriage and adapted to carry the load, said carriage being provided with a bearing, the axis of which is normally parallel to said direction of said movable jaw, a guiding member comprising a horizontal, hollow cylindrical arm pivotally fitted in said bearing, and a vertical hollow portion, said hollow cylindrical arm being provided with an inner slideway parallel to the direction of said movable jaw, a slider adapted to be reciprocated in said slideway, a swivelling link connecting said slider with said movable jaw, collapsible locking means fitted partly on the suspension means and partly on the guiding member to hold the suspension means in their lowermost position for constantly urging the jaws into their cable clamping position between said stations, means carried by each station for releasing said locking means, as the carriage passes said releasing means, the suspension means including at its upper end a vertical extension, engaging the vertical portion of said guiding member, a cam slotted member the cam of which is generally oblique with reference to the vertical, and a cam follower engaging the cam slot, said cam slot including a lower and an upper part differently sloped, the average direction of the lower part defining with the vertical an angle larger than the angle defined by the average direction of the upper part and the vertical, whereby said cam slotted member and cam follower are carried respectively by either one of the following parts: the suspension means and the slider, a vertically reciprocable disconnecting track adapted to take an upper and a lower position at each station, said track being sloped up with respect to said cable, so that in its upper position, said track is adapted to raise the suspension means in the guideway as it passes into a station, the raising of the suspension means acting on the slider through said cams in the extensions and said cam followers to urge the slider and movable jaw away from the fixed jaw, the lowering of the suspension means and load under the action of gravity at a point beyond the disconnecting track at each station returning the slider and movable jaw into their operative cable clamping positions first at a relatively high speed and with a small force, under the action of the lower part of said cam slots on their respective cam followers, and then at a relatively slow rate but with an energic thrust, for the actual clamping of the cable between the jaws, under the action of the upper part of said cams slots on their respective cam followers.

No references cited.